(12) United States Patent
Mintonye, II et al.

(10) Patent No.: US 8,783,783 B1
(45) Date of Patent: Jul. 22, 2014

(54) CHUTE ASSEMBLY FOR AN END-DUMP TRUCK

(71) Applicant: Minco Industrial Services, Inc., Jonestown, PA (US)

(72) Inventors: Edwin Arthur Mintonye, II, Jonestown, PA (US); Edwin Arthur Mintonye, III, Harrisburg, PA (US)

(73) Assignee: Minco International Services, Inc., Jonestown, PA (US)

( * ) Notice: Subject to any disclaimer, the term of this patent is extended or adjusted under 35 U.S.C. 154(b) by 0 days.

(21) Appl. No.: 14/012,122

(22) Filed: Aug. 28, 2013

(51) Int. Cl.
*B60P 1/00* (2006.01)
*B60P 1/28* (2006.01)

(52) U.S. Cl.
CPC .................................. *B60P 1/28* (2013.01)
USPC .......................................................... 298/7

(58) Field of Classification Search
USPC ...... 298/7, 1 B, 23 MD, 17 R; 193/4, 5, 25 R, 193/25 A, 25 C; 222/213, 632
See application file for complete search history.

(56) References Cited

U.S. PATENT DOCUMENTS

| 1,735,930 | A | | 11/1929 | Miller |
| 4,194,787 | A | | 3/1980 | Williamsen |
| 5,823,630 | A | * | 10/1998 | Graham .................. 298/23 S |
| 6,386,818 | B1 | * | 5/2002 | Reed |
| 7,731,297 | B1 | | 6/2010 | Ozanich |

* cited by examiner

*Primary Examiner* — Stephen Gordon
(74) *Attorney, Agent, or Firm* — Hooker & Habib, P.C.

(57) ABSTRACT

A chute assembly for mounting on the discharge end of the dump body of an end-dump truck to support the flow of particulate material being discharged from the dump body. A flexible load plate is sandwiched between a pair of rigid support plates and extends outwardly from the support plates for supporting the particulate material being discharged from the chute assembly.

20 Claims, 3 Drawing Sheets

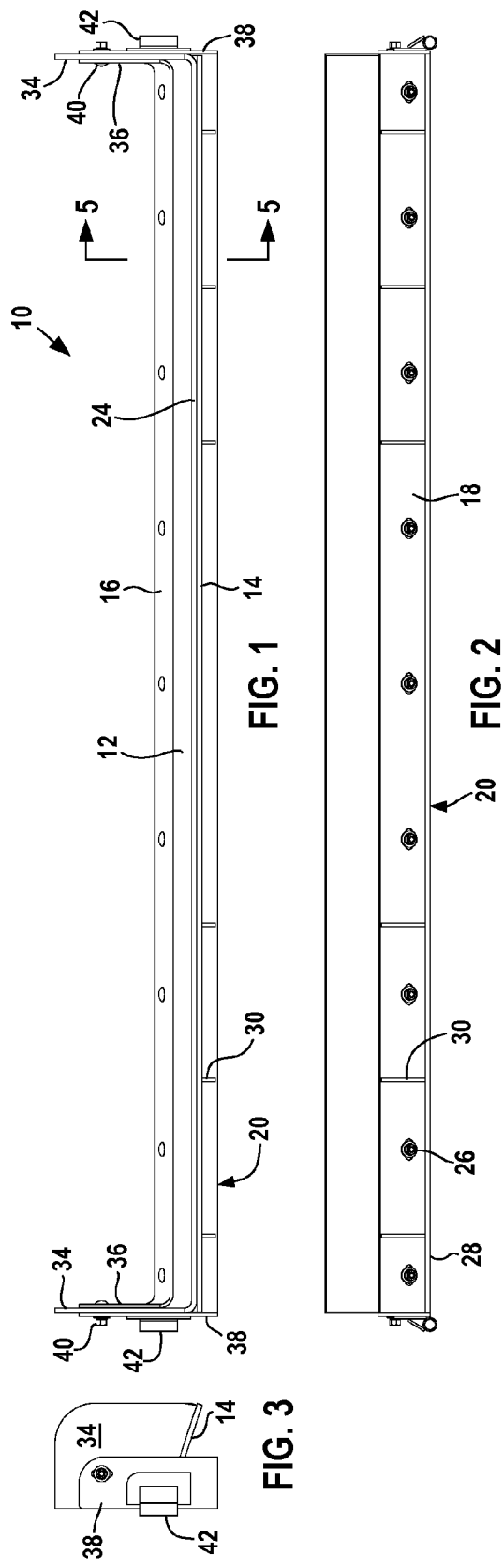

CHUTE ASSEMBLY FOR AN END-DUMP TRUCK

FIELD OF THE DISCLOSURE

This disclosure relates to accessories for end-dump trucks, and in particular, to a chute assembly for mounting on the discharge end of the dump body of an end-dump truck to support the flow of particulate material being discharged from the dump body.

BACKGROUND OF THE DISCLOSURE

End-dump trucks have a dump body with a pair of side walls interconnected by a floor that encloses a volume for receiving payload. The payload is often particulate material such as stone, asphalt, gravel, sand, and the like. The dump body has a closed front end and an open rear discharge, and usually a pivoting tailgate that closes the discharge end of the dump body during transport.

The front end of the dump body is raised to flow the material along the floor and out the discharge end of the dump body. The floor and side walls define a U-shaped chute to guide the flow of discharged material.

Particulate material is often dumped into a hopper of a distribution apparatus such as a self-powered asphalt spreader or a stone spreader that is attached to the rear of the truck. Sometimes the material will fall short of the hopper when the bed is initially being raised, with material falling onto the ground. This wastes material and requires cleanup.

To reduce the chances of the material missing the hopper, an auxiliary metal chute is sometimes added to the discharge end of the truck body to provide additional support for the material during discharge. These chutes may be jury-rigged from scrap metal or may be more of more sophisticated construction, such as the movable chute disclosed in Ozanich U.S. Pat. No. 7,731,297.

Raising the dump body, however, often causes the auxiliary chute to strike the distribution apparatus, causing damage to the apparatus or to the chute.

Thus there is a need for providing an improved chute assembly for mounting on the discharge end of the dump body of an end-dump truck. The improved chute assembly should reduce the risk of damage to the distribution apparatus or to the chute assembly itself, and should be easily removable to facilitate attachment of other devices, such as salt spreaders, to the end of the dump body.

BRIEF SUMMARY OF THE DISCLOSURE

Disclosed is a chute assembly for mounting on the discharge end of the dump body of an end-dump truck to support the flow of particulate material being discharged from the dump body. The disclosed chute assembly reduces the risk of damage to the distribution apparatus and to the chute assembly itself, and is easily removable for when it is not needed.

An embodiment of the chute assembly includes a first flexible plate having a width dimension and opposite inner and outer sides spaced apart by the width of the plate. An inner portion of the plate is sandwiched between a rigid lower support plate and a rigid upper support plate, and an outer portion of the flexible plate extends outwardly away from the upper and lower support plates.

A rigid mounting bracket is attached to the lower support plate, the mounting bracket configured to be placed against the discharge end of the dump body. The mounting bracket is positioned such that particulate matter discharged from the discharge end of the dump body flows over the upper support plate and the outer portion of the flexible plate.

In a preferred embodiment of the chute assembly, the chute assembly the chute assembly forms a U-shaped chute. To that end, the flexible plate forms part of an integral, one piece U-shaped member that includes a pair of flexible side walls interconnected by the flexible plate and the upper support plate forms part of an integral, one piece U-shaped member that includes a pair of rigid side walls interconnected by the upper support plate. The sides of the flexible member are sandwiched between the sides of the rigid support member and rigid sidewalls attached to the lower support member.

In yet a further preferred embodiment of the chute assembly, the flexible plate is inclined with respect to the floor of the dump body when the chute assembly is attached to the truck.

In yet another preferred embodiment of the chute assembly the flexible plate is made from EPDM rubber (ethylene propylene diene monomer rubber, a type of synthetic rubber). EPDM rubber has excellent heat and weather resistance. EPDM rubber is capable of withstanding temperatures of 350 degrees Fahrenheit, enabling the chute assembly to be used when discharging hot mixed asphalt from the dump body.

The disclosed chute assembly has a number of advantages. The chute assembly is relatively inexpensive and easy to manufacture. The flexible load plate enables the load plate to contact against a hopper receiving the particulate matter without damage to either the chute assembly or the hopper. The load plate can be easily removed and replaced while mounted on the truck without significant downtime. The chute assembly can be easily removed from the dump body when necessary to permit other uses of the truck.

Other objects and features of the disclosure will become apparent as the description proceeds, especially when taken in conjunction with the accompanying drawing sheets.

BRIEF SUMMARY OF THE DRAWINGS

FIG. 1 is an end view of an embodiment of a chute assembly;

FIG. 2 is a bottom view of the chute assembly;

FIG. 3 is a side view of the chute assembly;

DETAILED DESCRIPTION

Figure 4:
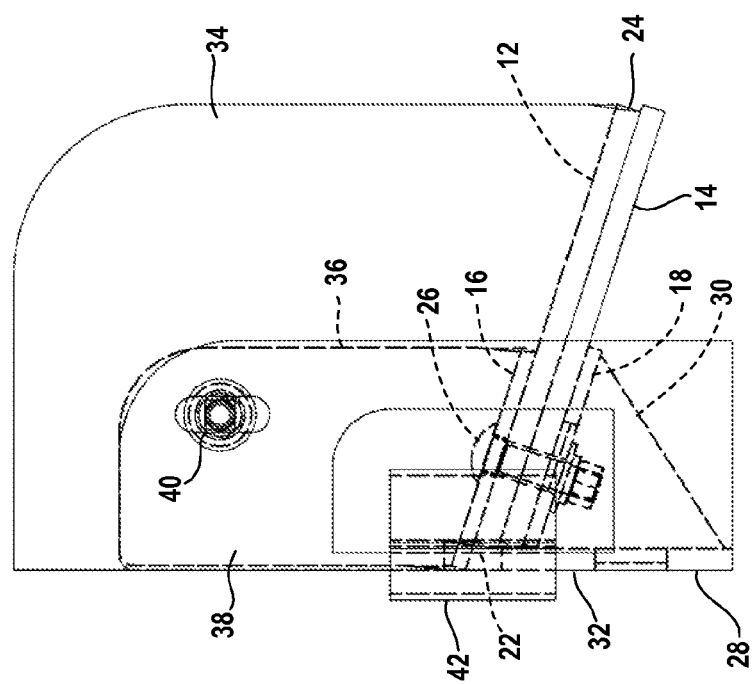
FIG. 4 is similar to FIG. 3 but is an enlarged side view of the chute assembly.

FIGS. 1-4 illustrate a chute assembly 10 for mounting on the discharge end of the dump body of an end-dump truck. The chute assembly 10 includes an upper flexible load plate 12 and a lower flexible support plate 14 sandwiched between rigid upper and lower support plates 16, 18. The lower support plate 18 is mounted on top of a rigid bracket 20 that locates the chute assembly 10 against the discharge end of the dump body.

The load plate 12 is elongate and formed from an elastomeric material. The load plate 12 is intended to span essentially the entire width of the discharge end of the dump bed to support the flow of particulate material being discharged from the floor of the dump body onto the load plate. The load plate 12 has opposite inner and outer sides 22, 24 spaced apart by the width of the plate. The portion of the load plate 12 extending along the inner side 22 is about four inches in width and is sandwiched between the upper and lower support plates 16, 18. The remaining width portion of the load plate 12 extending along the outer side 24 extends outwardly beyond the support plates 16, 18.

The flexible support plate 14 is substantially identical to the load plate 12 and underlies the load plate 12 for essentially the entire length of the load plate 12. The support plate 14 is intended to help resist sagging of the load plate 12 under load. In alternative embodiments of the chute 10, the flexible support plate 14 may be eliminated if the load plate 12 can be satisfactorily used alone.

The upper support plate 16 and the lower support plate 18 are each made from steel plate. Other materials, such as aluminum, can be used if engineered for sufficient strength and durability.

A number of spaced-apart nut-and-bolt fasteners 26 extend between the upper and lower support plates 16, 18 to urge the support plates together and compress the flexible plates 12, 14 between them. Nut-and-bolt fasteners enable quick disassembly and replacement or worn flexible plates 12, 14. Other types of fasteners could be used depending on material selection, etc.

The bracket 20 is made of steel but could be made of aluminum or other rigid material in other embodiments of the chute assembly 10. The bracket 20 includes a flat, elongate bar 28 that extends the length of the chute assembly 10 and a number of spaced apart triangular gussets 30 welded to the bar 28. The upper sides of the gussets 30 support the lower support plate 18. In the illustrated embodiment the lower support plate 18 is also welded to the gussets 30.

The bar 28 has a flat inner face or surface 32 that is intended to be placed against the discharge end of the dump body to locate the chute assembly 10 against the body as will be described in greater detail below. The surface 32 defines a vertical plane and a horizontal direction perpendicular to the plane. The upper sides of the gussets 30 are inclined to the horizontal to likewise incline the lower support plate 18 attached to the gussets 30 to the horizontal. As a result, the flexible plates 12, 14 and the upper end plate 16 are also inclined with respect to the horizontal and so are not perpendicular to the surface 32 and would not be perpendicular to the discharge end of the dump body. In the illustrated embodiment the flexible plates 12, 14 and the support plates 16, 18 are inclined at an angle of 18 degrees to the horizontal.

In the illustrated embodiment, the chute assembly 10 forms a U-shaped chute. To that end, the flexible load plate 12 forms part of an integral, one piece, flexible U-shaped member that includes a pair of flexible side walls 34 interconnected by the flexible load plate 12. The upper support plate 16 forms part of an integral, one piece rigid U-shaped member that includes a pair of rigid side walls 36 interconnected by the upper support plate 16.

The lower side plate 18 interconnects a pair of rigid side walls 38 that are also attached to opposite ends of the bracket bar 28. The flexible side walls 34 are sandwiched between pairs of side walls 36, 38, with nut and bolt fasteners 40 urging the pairs of side walls 36, 38 together.

The upper and outer portions of the side walls 34 extend outwardly beyond the pairs of rigid side walls 36, 38 as best seen in FIG. 4. The side walls 38 extend outwardly away from the bracket 20 and extend beyond the upper and lower support plates 16, 18.

Figure 5:
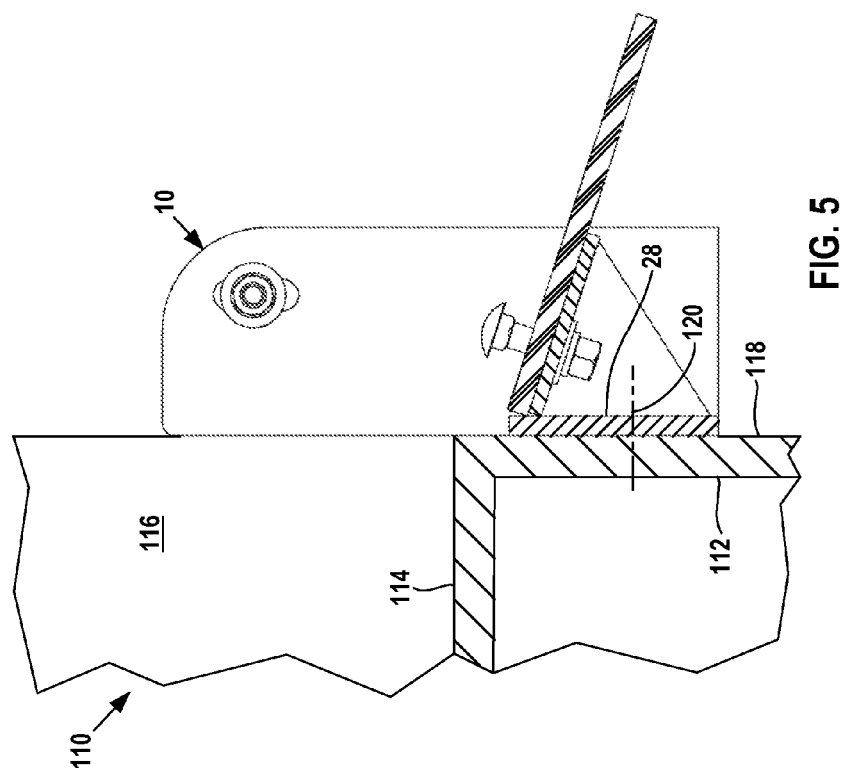
FIG. 5 is a sectional view of the chute assembly taken along line 5-5 of FIG. 1 and showing the chute assembly mounted on a dump bed of an end-dump truck, the figure showing the upper flexible member removed.

FIG. 5 illustrates the chute assembly 10 attached to an end-dump truck 110. The truck 110 includes a dump body 112 having a floor 114 that interconnects side walls 116. The bracket bar 28 is fastened to an end face 118 located on the discharge end of the dump body. The bracket bar 28 may be attached to the end face 118 by bolts represented by the horizontal centerlines 120.

End faces of dump bodies usually include sufficient openings that enable bolting of the bracket bar 28 to the dump body without modifications to the dump body. A user can drill bolt holes in the bar 28 that overlay to the openings, or the bar 28 can be provided with premanufactured bolt holes for attachment to specific models of trucks.

The chute assembly 10 is mounted in alignment with the side walls and floor of the dump body 112 so that particulate matter on the floor 114 discharged from the discharge end of the dump body flows over the upper support plate 16 and the outer portion of the flexible plate 14 and is contained between the flexible side walls 34.

Some accessories, such as salt spreaders, are mounted to the discharge end of end-dump trucks using alternative mounting structures. The chute assembly 10 can also be modified for mounting using such alternative mounting structures. For example, the illustrated chute assembly 10 includes a vertical sleeve 42 attached to the outside of each side wall 38. These sleeves 42 are placed between adjacent coaxial pairs of like sleeves attached to the sides of the dump body, with shafts inserted into the sleeves for mounting the sleeves 42 to the sides of the dump body. The sleeves 42 are positioned on the side walls 38 to properly align the chute assembly 10 with the floor and side walls of the dump body as previously described. The bracket bar 28 is preferably bolted to the end of the dump body as described even when using the sleeves 42 as part of an alternative mounting structure.

The illustrated chute assembly 10 is intended for use when discharging hot mixed asphalt, which is typically manufactured at temperatures of between 270 degrees Fahrenheit and 325 degrees Fahrenheit. Thus the load plate 12 and support plate 14 must be capable of adequate performance and wear despite exposure to materials at such temperatures. The illustrated load plate 12 and support plate are each cut from a uniform layer of EPDM rubber having a thickness of 0.422 inches and capable of withstanding temperatures of 350 degrees Fahrenheit. A suitable EPDM rubber used in the illustrated embodiment is available from Mulhern Belting, Inc., Oakland N.J. 07436 and sold as part no. 5-3733

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

The invention claimed is:

1. A chute assembly for mounting on a discharge end of a dump body of an end-dump truck to support the flow of particulate material being discharged from the dump body, the chute assembly comprising:

a first flexible plate, a rigid lower support plate, a rigid upper support plate, and a rigid mounting bracket;

the first flexible plate comprising a width dimension and opposite inner and outer sides spaced apart by the width of the first flexible plate, an inner portion of the first flexible plate on the inner side of the first flexible plate and an outer portion of the first flexible plate on the outer side of the first flexible plate;

the inner portion of the first flexible plate being sandwiched between the upper and lower support plates, the outer portion of the first flexible plate extending outwardly away from the upper and lower support plates; and the mounting bracket being attached to the lower support plate, the mounting bracket having an exposed surface being configured to be placed against the discharge end of the dump body to locate the chute assembly against the discharge end of the dump body such that particulate matter discharged from the discharge end of the dump body flows over the upper support plate and the outer portion of the first flexible plate;

wherein the upper support plate forms part of a first U-shaped rigid member that comprises said upper support plate and a pair of rigid first side walls interconnected and spaced apart by said upper support plate, and the first flexible plate forms part of a U-shaped flexible member that comprises a pair of flexible side walls interconnected by the first flexible plate, the flexible side walls of the U-shaped flexible member being attached to respective ones of said first side walls of the first U-shaped rigid member.

2. The chute assembly of claim 1 wherein the lower support plate forms part of a second U-shaped rigid member that comprises said lower support plate and a pair of rigid second side walls interconnected and spaced apart by said lower support plate, each flexible side wall of the first U-shaped flexible member sandwiched between a respective one of said first side walls of the first U-shaped rigid member and a respective one of said second side walls of the second U-shaped rigid member.

3. The chute assembly of claim 2 wherein the U-shaped flexible member and the first U-shaped rigid member are each formed from a respective integral one-piece member.

4. The chute assembly of claim 2 wherein an outer portion of the first flexible plate extends outwardly away from a side of each of the upper and lower support plates, the chute assembly further comprising a second flexible plate sandwiched between the upper and lower support plates, the second flexible plate being between the first flexible plate and the lower support plate, the second flexible plate comprising an outer portion extending outwardly away from the said sides of the upper and lower support plates.

5. The chute assembly of claim 4 wherein the second side walls of the second U-shaped rigid member are spaced apart by a length of the lower support plate and the second flexible plate extends substantially along the entire length of the lower support plate.

6. The chute assembly of claim 4 wherein the first and second flexible plates each comprises an elastomeric material.

7. The chute assembly of claim 1 in combination with an end-dump truck, the truck comprising a dump body having an end face located at a discharge end of the dump body, the mounting bracket of the chute assembly comprising an elongate bar having said mounting bracket surface, the mounting bracket surface mounted against the end face of the dump body.

8. The combination chute assembly and end-dump truck of claim 7 comprising one or more fasteners extending through the bar and into the end face of the dump body.

9. The combination chute assembly and end-dump truck of claim 7 wherein the chute assembly is mounted to the end face of the dump body such that when material is being discharged from the discharge end of the dump body, the material flows over the upper support plate and an outer portion of the first flexible plate before being discharged from the chute assembly, the material while being discharged from the dump body being contained between the flexible side walls of the U-shaped flexible member before being discharged from the chute assembly.

10. The chute assembly of claim 2 wherein each second side wall of the second U-shaped rigid member comprises an outer side facing away from the other second side wall, the chute assembly further comprising a pair of tubular sleeves, the sleeves being attached to the outer sides of the second side walls.

11. The chute assembly of claim 2 wherein the upper support plate is disposed between the pair of second side walls of the second U-shaped rigid member.

12. The chute assembly of claim 2 wherein each pair of the pairs of first and second side walls sandwiching said respective flexible side walls of the U-shaped flexible member are urged together by a rigid fastener extending between the pair of first and second side walls.

13. The chute assembly of claim 1 wherein the first flexible plate tolerates exposure to a temperature of at least 375 degrees Fahrenheit.

14. The chute assembly of claim 1 wherein the first flexible plate comprises EPDM rubber.

15. The chute assembly of claim 1 wherein the first flexible plate comprises a synthetic rubber material.

16. The chute assembly of claim 1 wherein the mounting bracket surface is a flat surface defining a vertical plane and a horizontal direction perpendicular to the plane, and the upper and lower support plates are inclined from the horizontal with respect to the vertical plane.

17. The chute assembly of claim 1 wherein a plurality of spaced-apart fasteners extend between the upper and lower support plates urging the upper and lower support plates towards one another.

18. The chute assembly of claim 1 wherein the mounting bracket comprises an elongate bar, the bar comprising said mounting bracket surface, and a plurality of gussets spaced apart along the bar, the gussets extending from the bar to the lower support plate.

19. The chute assembly of claim 18 wherein each gusset is fixedly attached to the lower support plate.

20. The chute assembly of claim 16 wherein the upper and lower support plates are inclined at an angle of eighteen degrees from the horizontal.

* * * * *

UNITED STATES PATENT AND TRADEMARK OFFICE
CERTIFICATE OF CORRECTION

| | | |
|---|---|---|
| PATENT NO. | : 8,783,783 B1 | Page 1 of 1 |
| APPLICATION NO. | : 14/012122 | |
| DATED | : July 22, 2014 | |
| INVENTOR(S) | : Mintonye, II et al. | |

It is certified that error appears in the above-identified patent and that said Letters Patent is hereby corrected as shown below:

On the title page item (73) should read -- Minco Industrial Services, Inc., Jonestown, PA (US) --

Signed and Sealed this
Fourteenth Day of October, 2014

Michelle K. Lee
*Deputy Director of the United States Patent and Trademark Office*